Patented Mar. 23, 1948

2,438,232

UNITED STATES PATENT OFFICE 2,438,232

PREPARATION OF CHOLIC ACID

Robert H. Sifferd, Hollywood, Ill., assignor to Armour and Company, Chicago, Ill., a corporation of Illinois No Drawing. Application January 7, 1944, Serial No. 517,435

10 Claims. (Cl. 260—397.1)

1

This invention relates to the obtaining of cholic acid from bile and animal excretions, and more particularly to a process for isolating cholic acid in a relatively pure state from bile and animal excretions.

This application is a continuation-in-part of my co-pending application Serial No. 397,643, filed June 11, 1941, now Patent No. 2,346,239 dated April 11, 1944, for Preparation of cholic acid.

Cholic acid is usually present in bile in the form of the sodium salts of the conjugated bile acids, taurocholic acid and glycocholic, although, in some cases, more or less free cholic acid exists. In the conjugated bile acids, cholic acid is combined with the indicated amino acid, either taurine or glycine, and it is liberated from the given combination by alkaline hydrolysis, as described in more detail later.

The acid has heretofore been liberated from its conjugated salt by alkaline hydrolysis of the salt or of material containing it. It has been customary, for example, to saponify bile and then to acidify the mixture to obtain a tarry mass. After standing for some time, the tar is washed and dried and then moistened with absolute alcohol to get a crystallized material which must be recrystallized from alcohol about four times. A week or longer is required for this process.

It has also been proposed to obtain cholic acid by treating the tarry mass resulting from acidification of the saponified bile with an aqueous solution of sodium acetate mixed with toluene. Such a process involves the difficulty of handling two immiscible liquid phases. Moreover, the cholic acid does not readily separate out in crystalline form, and other difficulties are encountered.

The present invention contemplates the recovery of cholic acid in a relatively high state of purity by treatment of cholic acid and the other bile substances associated therewith with an organic solvent for the cholic acid and an organic liquid miscible with the solvent in which the cholic acid is substantially insoluble. With this treatment, the cholic acid crystallizes in a relatively pure form and may be readily separated by filtration or otherwise while the other bile substances remain dissolved in the liquid mixture.

In accordance with the invention, the bile may be saponified and the product treated either before or after acidification with an organic solvent for the cholic acid, such as a water immiscible aliphatic alcohol, and an organic liquid, such as benzol or the like, which is miscible with

2 the solvent and in which the cholic acid is insoluble. If the bile substances have not been acidified, the mixture is acidified to free the gall acids, including the cholic acid. When the acidification of the saponified bile substances is carried out in the presence of the organic liquids, the aqueous phase in which the acidification is carried out may be removed from the non-aqueous phase before the cholic acid is to be separated. After the bile substances are mixed with the organic solvent and organic liquid, the mixture may be agitated to thoroughly disperse the cholic acid and other bile substances throughout the mixture. When agitation is carried out after the addition of the organic solvent and organic liquid, then the mixture is agitated after the acidification. The agitation may be carried on for a substantial period of time, for example from one to four hours, or until the cholic acid in the solvent organic liquid mixture crystallizes.

The bile which is to be treated may be saponified in the conventional manner with caustic soda, for example. The saponified material may be treated to form the free gall acids, including cholic acid by acidifying the material with an acid, such as hydrochloric, sulphuric, or acetic acid. Preferably, a strong acid is used. After acidification, the water may be removed from the bile substances which are substantially insoluble therein. The acidified bile substances are in the form of a tarry mass which is ready for further treatment.

The tarry mass of the acidified bile substances is treated with an organic solvent, such as an aliphatic alcohol, preferably hexanol. The material is also treated with an organic liquid in which cholic acid is insoluble and which is miscible with the solvent. Benzol is a suitable organic liquid for this purpose. The solvent and the organic liquid may be added simultaneously to the bile substances or, if desired, either the solvent or the organic liquid may be added prior to the addition of the other. In any event, a mixture is ultimately formed in which the solvent and the organic liquid are in a single phase and in which the bile substances are distributed or dispersed therein.

If desired, instead of acidifying the saponified bile substances prior to treatment with the organic solvent and organic liquid, the organic solvent and the organic liquid may be added to the aqueous solution of the saponified bile substances. The mixture may then be acidified by the addition of a suitable acid. In this event, the aqueous phase may be separated from the non-aqueous phase after acidification, the bile substances remaining in the non-aqueous phase.

The mixture of the organic solvent and organic liquid with the acidified bile substances is preferably agitated for a substantial period of time, for example, in the neighborhood of one to four hours. At the end of this time, the cholic acid is present in crystalline form and is readily separated from the mixture. The mixture may be filtered, centrifuged, or otherwise treated to remove the crystalline cholic acid.

The cholic acid which is obtained in this procedure is of a relatively high state of purity. However, if greater purity is desired, the cholic acid may be recrystallized by dissolving it in the smallest possible quantity of amyl alcohol at a temperature below 90° C. To this solution may be added two to four volumes of benzol to cause the cholic acid to crystallize out of the solution. The cholic acid which is thus recovered may then be recrystallized from about five volumes of hot ethyl alcohol by the addition to the alcohol of an equal volume of water. The crystals recovered by filtration are washed on a filter with aqueous ethyl alcohol, and finally washed with water. From the process described, a yield of 75 gms. of cholic acid in a very pure state may be obtained from each gallon of bile.

Any suitable organic solvent for the cholic acid may be used in the treatment. Preferably, an aliphatic alcohol, such as hexanol, normal butyl alcohol, or amyl alcohol, is used. If the acidification is carried out prior to the addition of the organic solvent and the aqueous phase removed from the bile substances, a water miscible alcohol, such as ethyl or methyl alcohol, may be used. If, on the other hand, the acidification is carried out after the addition of the solvent, a water immiscible alcohol, such as hexanol or amyl alcohol, is to be preferred.

The organic liquid which is used should be one in which the cholic acid is substantially insoluble and which is miscible with the organic solvent used. The organic liquid is preferably a solvent for at least some of the bile substances from which the cholic acid is to be isolated. Instead of benzol, any liquid aromatic hydrocarbon, such as toluene, xylene, and the like, or monochlorbenzene, dichlorbenzene, liquid aliphatic hydrocarbons, or liquid chlorinated aliphatic hydrocarbons and the like may be used as the organic liquid in the mixture.

The proportions of the organic solvent and organic liquid may be varied substantially without seriously affecting the efficiency of the reaction. However, the benzol or other organic liquid should be present in quantity at least twice as great by weight as the quantity of the alcohol present. Preferably, the ratio is approximately 4 to 1. When the organic solvent and organic liquid are added to a bile, the quantity of the alcohol or other solvent should be in excess of 1% of the bile, preferably between 4% and 7%. In such a mixture, the benzol or other organic liquid may be present in a quantity approximately four times as great as the quantity of the alcohol present, for example, between 15% and 30%. All proportions of ingredients of the mixture referred to herein are by weight.

The following are specific examples of the process:

Example 1

To 500 gal. of saponified ox bile is added 20 gal. of n-hexanol and 150 gal. of benzol. The mixture is acidified by the addition of 130 gal. muriatic acid with vigorous agitation. Mixing of the two phase mixture is continued for one to four hours to allow crystallization, after which time the mixture is permitted to stand for separation of the two phases. The lower aqueous layer is then drawn off and discarded, and the solvent phase, containing cholic acid in suspension, is filtered for recovery of the cholic acid which may be purified by any of the usual means.

Example 2

To 500 gal. of saponified ox bile is added 40 gal. of commercial amyl alcohol and 150 gal. of benzol. The mixture is acidified by the addition of 130 gal. muriatic acid with vigorous agitation. Mixing of the two phase mixture is continued for one to four hours to allow crystallization, after which time the mixture is permitted to stand for separation of the two phases. The lower aqueous layer is then drawn off and discarded, and the solvent phase, containing cholic acid in suspension, is filtered for recovery of the cholic acid which may be purified by any of the usual means.

Example 3

To 500 gal. of saponified ox bile is added 35 gal. of n-hexanol and 150 gal. of toluol. The mixture is acidified by the addition of 130 gal. muriatic acid with vigorous agitation. Mixing of the two phase mixture is continued for one to four hours to allow crystallization, after which time the mixture is permitted to stand for separation of the two phases. The lower aqueous layer is then drawn off and discarded, and the solvent phase, containing cholic acid in suspension, is filtered for recovery of the cholic acid which may be purified by any of the usual means.

Example 4

To 500 gal. saponified ox bile is added 130 gal. muriatic acid, bringing the acidity of the mixture to pH 3. The tarry precipitate of crude bile acids, fatty acids and pigments is separated from the aqueous solution and is suspended in a mixture of 40 gal. ethyl alcohol and 150 gal. chlorbenzene. Cholic acid crystallizes after one to four hours of continued agitation. It is removed by filtration and purified by any of the usual procedures.

Although the invention has been described in connection with certain specific examples, this description is for the purpose of illustration only and changes and modifications obviously may be made without departing from the spirit and scope of the invention.

I claim:

1. In a process for isolating cholic acid from bile, the steps of treating the cholic acid and other bile substances associated therewith with a water-immiscible aliphatic alcohol solvent for cholic acid and an organic liquid miscible with said solvent and in which cholic acid is substantially insoluble, said liquid being selected from the group consisting of aromatic, aliphatic and chlorinated hydrocarbons, the ratio of the organic liquid to the solvent being at least two to one, and separating solid cholic acid therefrom.

2. In a process for isolating cholic acid from bile, the steps of treating the cholic acid and other bile substances associated therewith with a water-immiscible aliphatic alcohol solvent for cholic acid and an organic liquid miscible with said solvent and in which cholic acid is substantially insoluble, said liquid being selected from a group consisting of aromatic, aliphatic and chlorinated hydrocarbons the ratio of the organic liquid to the solvent being at least two to one, dispersing the cholic acid and other bile substances in the mixture of the solvent and organic liquid, and separating solid cholic acid from the mixture.

3. In a process for isolating cholic acid from bile, the steps of treating the cholic acid and other bile substances associated therewith with a water-immiscible aliphatic alcohol solvent for cholic acid and an organic liquid miscible with said solvent and in which cholic acid is substantially insoluble, said liquid being selected from the group consisting of aromatic, aliphatic and chlorinated hydrocarbons the ratio of the organic liquid to the solvent being at least two to one, dispersing the cholic acid and other bile substances in the mixture of the organic solvent and organic liquid, maintaining the mixture in the dispersed state until cholic acid crystals are formed in the mixture, and separating the crystalline cholic acid from the liquid mixture.

4. In a process for isolating cholic acid from bile, the steps of treating the cholic acid and other bile substances associated therewith with a mixture of a water-immiscible aliphatic alcohol solvent for cholic acid and an organic liquid miscible with said solvent and in which cholic acid is substantially insoluble, said liquid being selected from the group consisting of aromatic, aliphatic and chlorinated hydrocarbons, the ratio of the organic liquid to the solvent being at least two to one, dispersing the cholic acid and other bile substances in the mixture of the solvent and organic liquid, maintaining the mixture in the dispersed state for a substantial period of time to permit cholic acid crystals to form in the mixture, and separating the crystalline cholic acid from the liquid mixture.

5. A process as set forth in claim 4 wherein the cholic acid and other bile substances associated therewith are treated with a mixture containing approximately four times as great a quantity of organic liquid as of said solvent.

6. In a process for isolating cholic acid from bile, the steps of treating the bile comprising cholic acid and other bile substances associated therewith with a water-immiscible aliphatic alcohol and an organic liquid miscible with said alcohol and in which cholic acid is substantially insoluble, said organic liquid being selected from the group consisting of aromatic, aliphatic and chlorinated hydrocarbons, the quantity of the alcohol being in excess of 1% of the bile and the quantity of the organic liquid being at least four times as great, agitating the mixture to disperse therethrough the cholic acid and other bile substances, and thereafter separating solid cholic acid from the liquid mixture.

7. In a process for isolating cholic acid from bile, the steps of treating aqueous saponified bile with a mixture of a water immiscible aliphatic alcohol and an organic liquid miscible with said alcohol and in which cholic acid is substantially insoluble, said organic liquid being selected from the group consisting of aromatic, aliphatic and chlorinated hydrocarbons, the quantity of organic liquid being at least 4% of the bile and at least twice as great as the quantity of the alcohol, acidifying the saponified bile in the mixture, agitating the mixture, separating the aqueous and non-aqueous phases in the mixture, and separating solid cholic acid from the non-aqueous phase.

8. In a process for isolating cholic acid from bile, the steps of acidifying aqueous saponified bile to precipitate gall acids including cholic acids, removing the water from the precipitate, treating the precipitate with a mixture of a water-immiscible aliphatic alcohol and an organic liquid miscible with said alcohol and in which cholic acid is substantially insoluble, said organic liquid being selected from the group consisting of aromatic, aliphatic and chlorinated hydrocarbons, the quantity of solvent being in excess of 1% of the bile and that of the organic liquid at least twice as great, agitating the mixture for a substantial period of time, and separating crystalline cholic acid from the mixture.

9. In a process for isolating cholic acid from bile, the steps of treating aqueous saponified bile with a mixture between approximately 1% and 7% of hexanol and a quantity of benzol equal to approximately four times the quantity by weight of the hexanol, acidifying the mixture, agitating the mixture for a substantial period of time, separating the aqueous and the non-aqueous phases in the mixture, and filtering the non-aqueous phase to recover crystalline cholic acid therefrom.

10. In a process for isolating cholic acid from bile, the steps of treating the cholic acid and other bile substances associated therewith with hexanol and an organic liquid miscible with said solvent and in which cholic acid is substantially insoluble, said organic liquid being selected from the group consisting of liquid aromatic, aliphatic, and chlorinated aliphatic hydrocarbons, the ratio of the organic liquid to the solvent being at least two to one, and separating solid cholic acid therefrom.

ROBERT H. SIFFERD.

REFERENCES CITED

The following references are of record in the file of this patent:

UNITED STATES PATENTS

| Number | Name | Date |
|---|---|---|
| 2,346,239 | Sifferd | Apr. 11, 1944 |